(12) United States Patent
Chen

(10) Patent No.: US 12,287,507 B2
(45) Date of Patent: *Apr. 29, 2025

(54) ILLUMINATED KEYBOARD AND BACKLIGHT MODULE

(71) Applicant: Lite-On Technology Corporation, Taipei (TW)

(72) Inventor: Yi-Wen Chen, Taipei (TW)

(73) Assignee: Lite-On Technology Corporation, Taipei (TW)

( * ) Notice: Subject to any disclaimer, the term of this patent is extended or adjusted under 35 U.S.C. 154(b) by 4 days.

This patent is subject to a terminal disclaimer.

(21) Appl. No.: 18/637,465

(22) Filed: Apr. 17, 2024

(65) Prior Publication Data

US 2024/0264358 A1    Aug. 8, 2024

Related U.S. Application Data

(63) Continuation of application No. 17/939,994, filed on Sep. 8, 2022.

(60) Provisional application No. 63/242,498, filed on Sep. 10, 2021.

(51) Int. Cl.
  *F21V 8/00*    (2006.01)

(52) U.S. Cl.
  CPC .................... *G02B 6/005* (2013.01)

(58) Field of Classification Search
  CPC ...................................... G02B 6/005
  See application file for complete search history.

(56) References Cited

U.S. PATENT DOCUMENTS

| 11,175,444 | B1* | 11/2021 | Pan ...................... G02B 6/0088 |
| 11,587,745 | B1* | 2/2023 | Lien ...................... G06F 3/0202 |
| 2021/0280379 | A1* | 9/2021 | Chen ...................... H01H 9/182 |
| 2023/0047235 | A1* | 2/2023 | Chen ...................... G06F 3/0213 |
| 2023/0053436 | A1* | 2/2023 | Horiuchi ................ H01H 13/83 |

* cited by examiner

*Primary Examiner* — Christopher E Dunay
(74) *Attorney, Agent, or Firm* — JCIPRNET

(57) ABSTRACT

An illuminated keyboard includes a keyboard module, a circuit board and a backlight module. The keyboard module includes a bracket and at least one first key cap, disposed above the bracket. The circuit board has a first surface facing towards the at least one first key cap and a second surface facing away from the at least one first key cap, at least one top-emitting element is disposed on the first surface, and at least one side-emitting element is disposed on the second surface. The backlight module is disposed below the keyboard module and includes a light guide plate having a slot. The at least one side-emitting element extends into the slot such that the light emitted from the at least one side-emitting element enters the light guide plate. The light passes through a light output zone of the bracket and illuminate the at least one first key cap.

18 Claims, 8 Drawing Sheets

ILLUMINATED KEYBOARD AND BACKLIGHT MODULE

CROSS-REFERENCE TO RELATED APPLICATION

This application is a continuation application of and claims the priority benefit of U.S. application Ser. No. 17/939,994, filed on Sep. 8, 2022, which claims the priority benefit of U.S. provisional application Ser. No. 63/242,498, filed on Sep. 10, 2021. The entirety of each of the above-mentioned patent applications is hereby incorporated by reference herein and made a part of this specification.

BACKGROUND

Technical Field

The disclosure relates to a keyboard, and particularly relates to an illuminated keyboard.

Description of Related Art

With the advancement of technology, light emitting functions to be provided by illuminated keyboard keys become more and more diverse. How to integrate the light sources of the illuminated keyboard to illuminate specific keys and modules is a target of the filed.

SUMMARY

The disclosure provides an illuminated keyboard having a top-emitting element and a side-emitting element.

An embodiment of the illuminated keyboard of the disclosure includes a keyboard module, a circuit board and a backlight module. The keyboard module includes a bracket and at least one first key cap disposed above the bracket. The circuit board has a first surface facing towards the at least one first key cap and a second surface facing away from the at least one first key cap, at least one top-emitting element is disposed on the first surface, and at least one side-emitting element is disposed on the second surface. The backlight module is disposed below the keyboard module and includes a light guide plate having a slot. The at least one side-emitting element extends into the slot such that the light emitted from the side-emitting element enters the light guide plate, passes through a light output zone of the bracket and illuminate the at least one first key cap.

In an illuminated keyboard according to an embodiment of the disclosure, the circuit board is disposed between the backlight module and the keyboard module.

In an illuminated keyboard according to an embodiment of the disclosure, the illuminated keyboard further includes a mask layer, wherein the mask layer is disposed between the circuit board and the keyboard module or between the circuit board and the backlight module, the mask layer includes a transparent zone, light emitted from the top-emitting element or the at least one side-emitting element emitted to the at least one first key cap through the transparent zone.

In an illuminated keyboard according to an embodiment of the disclosure, the backlight module includes a reflector, the light guide plate and the circuit board are located between the bracket and the reflector.

In an illuminated keyboard according to an embodiment of the disclosure, the bracket includes a first segment and a second segment, an orthographic projection of the at least one first key cap projected to the bracket is located at the first segment, and an orthographic projection of the top-emitting element projected to the bracket is located at the second segment.

In an illuminated keyboard according to an embodiment of the disclosure, the illuminated keyboard further includes a touch module or a second key cap disposed above the second segment of the bracket so that the top-emitting element is located below the touch module or the second key cap and emits towards the touch module or the second key cap.

In an illuminated keyboard according to an embodiment of the disclosure, a top surface of the second key cap or the touch module and a top surface of the first key cap are at a same height.

In an illuminated keyboard according to an embodiment of the disclosure, a level height of a top surface of the first segment of the bracket is lower than a level height of a top surface of the second segment of the bracket, and the first key cap has a greater keystroke travel distance than the second key cap.

In illuminated keyboard according to an embodiment of the disclosure, the bracket comprises an inclined segment connected between the first segment and the second segment.

In an illuminated keyboard according to an embodiment of the disclosure, an accommodating space is formed below the second segment of the bracket, and the circuit board is located in the accommodating space.

In an illuminated keyboard according to an embodiment of the disclosure, the illuminated keyboard further includes a spacer located between the bracket and the circuit board or between the circuit board and the backlight module.

In an illuminated keyboard according to an embodiment of the disclosure, the illuminated keyboard further includes at least one mask member, the at least one side-emitting element includes a plurality of side-emitting elements, each of the at least one mask member is disposed on the light guide plate and located between two adjacent side-emitting elements.

In an illuminated keyboard according to an embodiment of the disclosure, the light guide plate includes at least one mask opening, and the at least one mask member is disposed in the at least one mask opening.

In an illuminated keyboard according to an embodiment of the disclosure, the mask member is a mask fence, the mask fence surrounds three sides of one of the side-emitting elements.

In an illuminated keyboard according to an embodiment of the disclosure, the illuminated keyboard further includes a reflecting module, the light guide plate is located between the reflecting module and the keyboard module, the reflecting module includes a pattern formed by pigments.

In an illuminated keyboard according to an embodiment of the disclosure, the reflecting module is an e-Paper module.

In an illuminated keyboard according to an embodiment of the disclosure, the illuminated keyboard further includes a touch module disposed on the bracket, wherein the touch module includes a touch plate and a light guide layer, the circuit board is disposed between the touch module and the backlight module.

In an illuminated keyboard according to an embodiment of the disclosure, the touch module further comprises a reflecting film, the reflecting film is located between the light guide layer and the circuit board, the reflecting film comprises a least one hole accommodating the top-emitting element. In summary, the illuminated keyboard provided by the embodiments of the disclosure includes one circuit board on which the at least one side-emitting element and the top-emitting element are integrated. The at least one side-emitting element emits light from its side to illuminate the first key caps while the top-emitting element emits light upwardly to illuminate the second key cap or the touch module on the top thereof. In this way, the disclosure is capable to illuminate specific keys or different modules with reduced elements and space.

Several embodiments accompanied with drawings are described in detail as follows for further comprehension.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
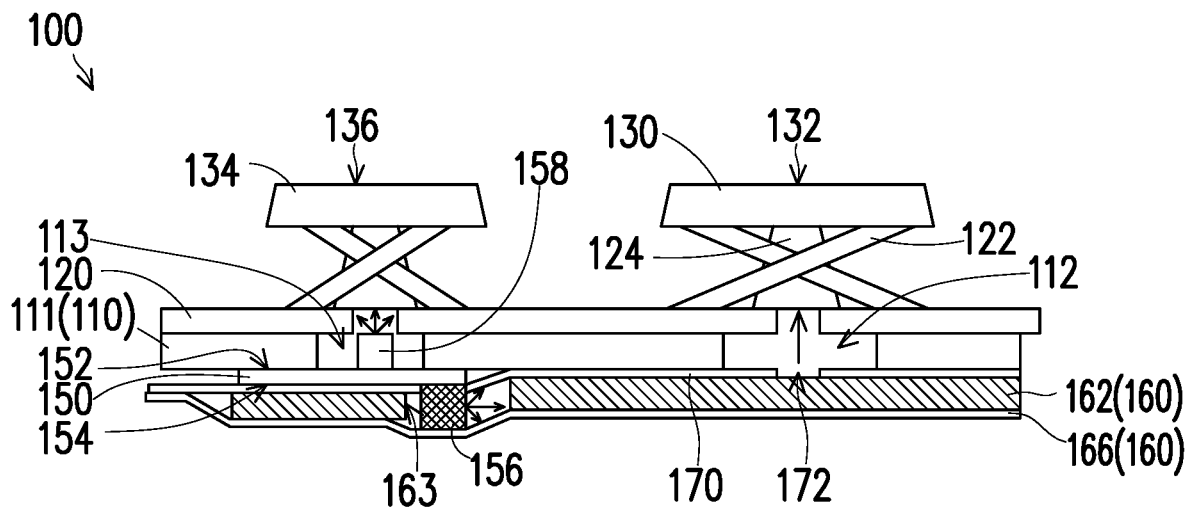
FIG. 1 is a partially enlarged schematic sectional view of an illuminated keyboard according to an embodiment of the disclosure.

Descriptions of the disclosure are given with reference to the exemplary embodiments illustrated by the accompanying drawings. Wherever possible, the same reference numbers are used in the drawings and the description to refer to the same or like parts.

FIG. 1 is a partially enlarged schematic sectional view of an illuminated keyboard 100 according to an embodiment of the disclosure. With reference to FIG. 1, in this embodiment, the illuminated keyboard 100 includes a keyboard module 110, a circuit board 150 and a backlight module 160.

The keyboard module 110 includes a bracket 111, a circuit membrane 120 disposed on the bracket 111, at least one first key cap 130 disposed on the bracket 111 and a second key cap 134 disposed on the bracket 111. The first key cap 130 may be a normal input key cap, and the second key cap 134 may be a function key cap, but types of the first key cap 130 and the second key cap 134 are not limited thereto. In the embodiment, a top surface 132 of the first key cap 130 and a top surface 136 of the second key cap 134 are at a same height, so as to provide consistency in appearance.

The circuit membrane 120 may be, for example, a copper foil substrate or an etching circuit membrane 120 (TCM), but type of the circuit membrane 120 is not limited thereto. In the embodiment, supporting structures 122 and elastic members 124 are disposed between the bracket 111 and the first key cap 130 and between the bracket 111 and the second key cap 134. The supporting structures 122 and elastic members 124 together determine the keystroke travel distance of the corresponding key and allow the first key cap 130 and the second key cap 134 move up and down reciprocally.

The circuit board 150 is disposed between the backlight module 160 and keyboard module 110. The circuit board 150 includes a first surface 152 facing towards the first key cap 130 and the second key cap 134 and a second surface 154 facing away from the first key cap 130 and the second key cap 134. The circuit board 150 can be a Printed Circuit Board (PCB) or Flexible Printed Circuit Board (FPC). In the embodiment, the circuit board 150 is located below the second key cap 134 and does not extend to a position below the first key cap 130 so as to reduce occupancy below the first key cap 132, but the arrangement of the circuit board 150 is not limited thereto.

In the embodiment, at least one side-emitting element 156 and a top-emitting element 158 are disposed at the circuit board 150. The top-emitting element 158 is disposed on the first surface 152, and the side-emitting element 156 is disposed on the second surface 154. The side-emitting element 156 is a light emitting element that mainly emits light from its side surface, and the top-emitting element 158 is a light emitting element that mainly emits light from its top surface. Examples of the side-emitting element and top-emitting element include but not limited to LEDs.

FIG. 1 shows one first key cap 130 and one side-emitting element 156, but in other embodiment, the number of the first key cap 130 and the side-emitting element 156 may be two or more. The number of the first key cap 130 may be or may not be corresponding to the number of the side-emitting element 156.

The backlight module 160 is disposed below the keyboard module 110 and includes a light guide plate 162 and a reflector 166. The light guide plate 162 has a least one slot 163 for insertion of the side-emitting element 156. In the embodiment, the light guide plate 162 and the circuit board 150 are located between the bracket 111 and the reflector 166, and the circuit board 150 is disposed between the bracket 111 of the keyboard module 110 and the light guide plate 162 of the backlight module 160, allowing the side-emitting element 156 extend into the slot 163 of the light guide plate 162, but the arrangement is not limited thereto.

The illuminated keyboard 100 further includes a mask layer 170 for light shielding, the mask layer 170 is disposed between the circuit board 150 and the backlight module 160. The mask layer 170 includes a transparent zone 172 through which the lights could pass. Preferably, the mask layer 170 may be a black Mylar layer, and the transparent zone 172 may be a through hole corresponding to the first key cap 130.

In the embodiment, the side-emitting element 156 is distant from the first key cap 130 in a horizontal direction.

The light emitted from the side-emitting element 156 enters the light guide plate 162 through the slot 163, and then transmits within the light guide plate 162, reflected by the reflector 166, and finally passes through the transparent zone 172 of the mask layer 170, a light output zone 112 of the bracket 111, circuit membrane 120 and emits towards the first key cap 130. In other embodiment, where the number of the first key caps 130 is two or more, light emitted from the side-emitting element 156 is capable of transmitting along the light guide plate 162 so as to provide a wide transmission of optical effect for illuminating more of the first key caps 130.

Moreover, the top-emitting element 158 is located below the second key cap 134, and may extend into the light output zone 113 of the bracket 111. Light emitted from the top-emitting element 158 transmits upwardly towards the second key cap 134. In other words, the top-emitting element 158 is used for providing unique optical effect exclusively for the second key cap 134.

It is noted that, in the embodiment, the at least one side-emitting element 156 and the top-emitting element 158 are integrated to the same circuit board 150 in the illuminated keyboard 100, such that the arrangement of the elements of the illuminated keyboard 100 can be simplified, and the illuminated keyboard 100 can save more space.

Figure 2:
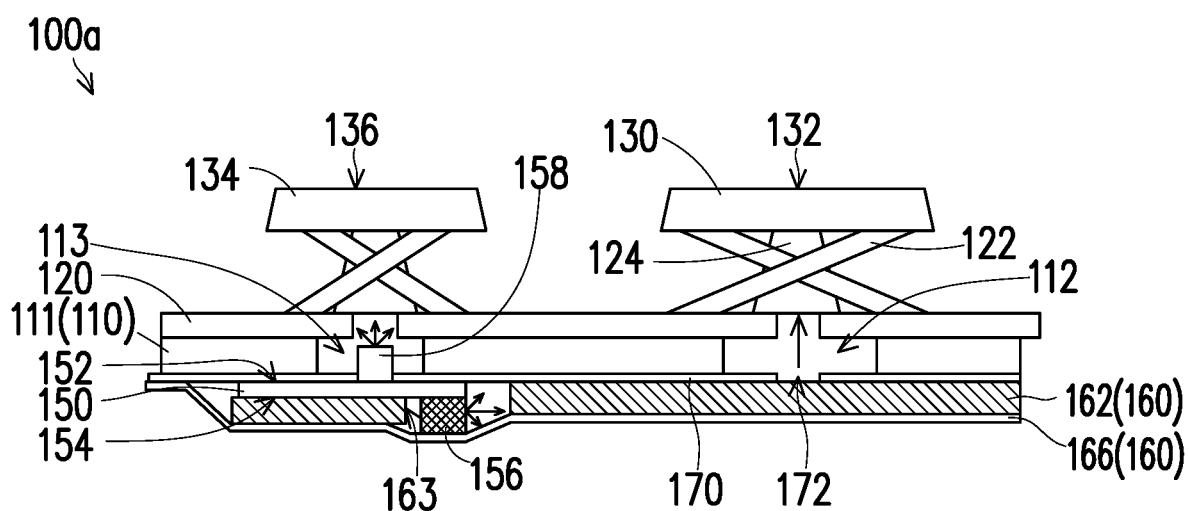
FIG. 2 is a partially enlarged schematic sectional view of an illuminated keyboard according to another embodiment of the disclosure.

FIG. 2 is a partially enlarged schematic sectional view of an illuminated keyboard 100a according to another embodiment of the disclosure. With reference to FIG. 2, the main difference between FIG. 1 and FIG. 2 is as below. In FIG. 1, the circuit board 150 is disposed between the mask layer 170 and the keyboard module 110, and the side-emitting element 156 penetrates through the mask layer 170 and extends into the slot 163 of the light guide plate 162. In this embodiment of FIG. 2, the mask layer 170 is disposed between the keyboard module 110 and the circuit board 150. The top-emitting element 158 penetrates through the mask layer 170 and extends into the light output zone 113 of the bracket 111.

In this embodiment, lights emitted from the side-emitting element 156 and the top-emitting element 158 transmit in a similar way as described in the preceding embodiment. However, in the embodiment, the circuit board 150 is located between the mask layer 170 and the light guide plate 162, such that the side-emitting element 156 is entirely covered by the mask layer 170, thereby reducing chances of light leaking of the side-emitting element 156 from the mask layer 170.

Figure 3:
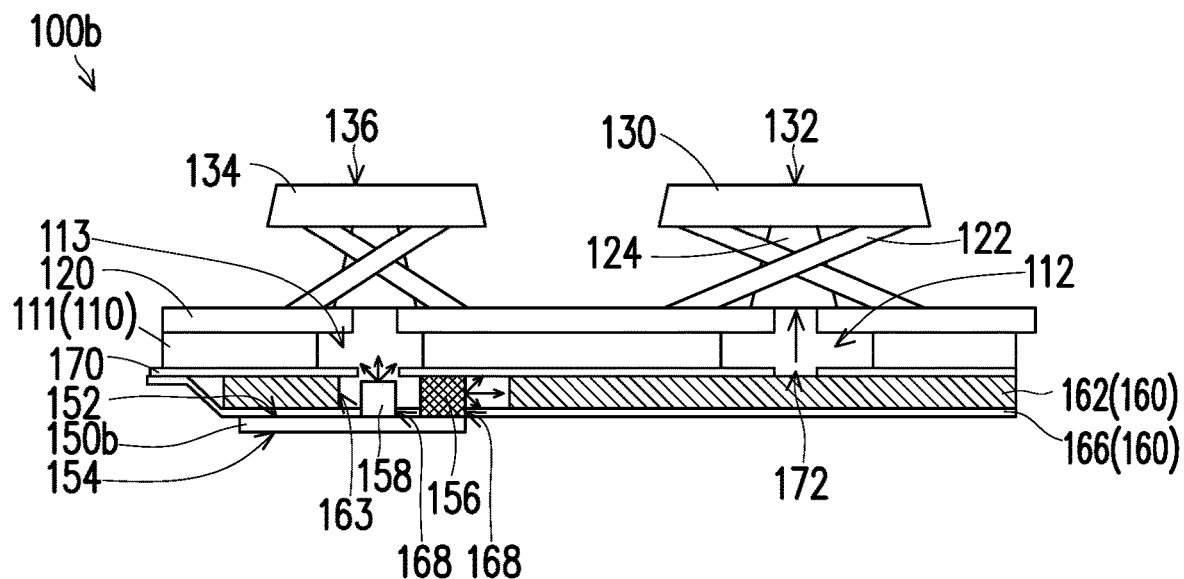
FIG. 3 is a partially enlarged schematic sectional view of an illuminated keyboard according to another embodiment of the disclosure.

FIG. 3 is a partially enlarged schematic sectional view of an illuminated keyboard 100b according to another embodiment of the disclosure. With reference to FIG. 3, in this embodiment, the top-emitting element 158 and the at least one side-emitting element 156 are both disposed on the first surface 152 (the top surface) of the circuit board 150b, and the circuit board 150b is disposed below the backlight module 160. In other words, the circuit board 150b may be a single sided circuit board, but it is not limited thereto.

In this embodiment, the reflector 166 is located between the light guide plate 162 and the circuit board 150b. The reflector 166 includes at least one accommodating hole 168 for accommodating the top-emitting element 158 and the at least one side-emitting element 156. That is, the top-emitting element 158 and the at least one side-emitting element 156 may pass through respective accommodating holes 168 or one common accommodating hole 168 of the reflector 166. The side-emitting element 156 extends into the slot 163 of the light guide plate 162, such that light emitted from the side-emitting element 156 enters the light guide plate 162 through the slot 163, and then transmits within the light guide plate 162, and emit towards the first key cap 130.

The top-emitting element 158 also extends into the slot 163 of the light guide plate 162, yet light emitted from the top-emitting element 158 emits upwardly directly toward the second key cap 134 without via a transmission within the light guide plate 162.

In this embodiment, a single sided circuit board 150b can be utilized to reduce the complexity and space taken by the circuit board 150b. In addition, the top-emitting element 158 and the at least one side-emitting element 156 do not penetrate through the mask layer 170, thereby reducing chances of light leaking from the mask layer 170.

Figure 4:
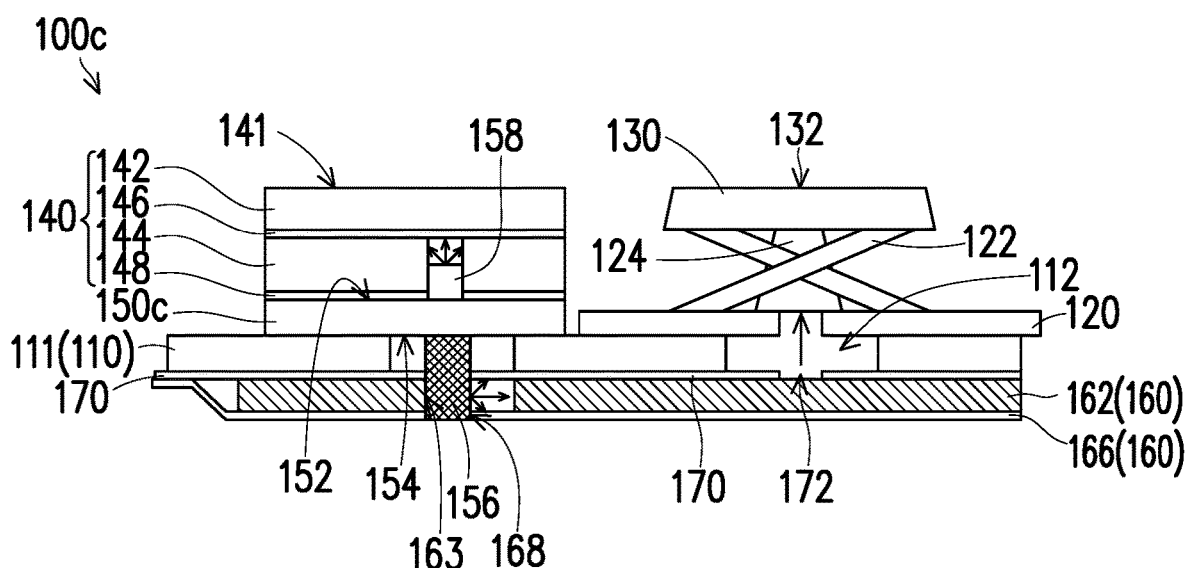
FIG. 4 is a partially enlarged schematic sectional view of an illuminated keyboard according to another embodiment of the disclosure.

FIG. 4 is a partially enlarged schematic sectional view of an illuminated keyboard 100c according to another embodiment of the disclosure. With reference to FIG. 4, in this embodiment, the second key cap 134 in FIG. 3 is replaced by the touch module 140 to further provide a touch function. For instance, the touch module 140 may be configured to determine information such as a finger movement direction or gestures such as pinching, swiping and dragging. The touch module 140 may feature a capacitive design, but type of the touch module 140 is not limited thereto.

The circuit board 150c is disposed between the touch pad module 140 and the backlight module 160. In the embodiment, the circuit board 150c is between the touch module 140 and the bracket 111 of the keyboard module 110. The touch module 140 may include a touch plate 142, a light guide layer 144, a masking film 146 and a reflecting film 148. The circuit board 150c is disposed below the reflecting film 148 and disposed on the bracket 111.

A touch circuit (not shown) is formed on the first surface 152 of the circuit board 150c so as to provide a touch function. In other words, the circuit board 150c is the circuit board not only for the side-emitting element 156 and the top-emitting element 158, but also for the touch module 140.

As shown in FIG. 4, the top-emitting element 158 is disposed on the first surface 152 of the circuit board 150, penetrates through the reflecting film 148 and extends into the light guide layer 144 via a hole thereon. Light emitted from the top-emitting element 158 enters the light guide layer 144 and emits from a transparent zone of the masking film 146 so as to provide specific optical effect to the touch plate 142. Certainly, a light path of the light emitted from the top-emitting element 158 is not limited thereto.

The side-emitting element 156 is disposed on the second surface 154 of the circuit board 150, penetrates through the bracket 111, the mask layer 170 and extends into the light guide plate 162. Light emitted from the side-emitting element 156 enters the light guide plate 162 and emits towards the first key cap 130.

In addition, in the embodiment, a top surface 141 of the touch module 140 and the top surface 132 of the first key cap 130 are at a same height, so as to provide consistency in appearance. However, it is not limited thereto.

It is noted that, in this embodiment, the touch circuit, the side-emitting element 156 and the top-emitting element 158 are integrated to the same circuit board 150c in the illuminated keyboard 100c, such that the arrangement of the elements of the illuminated keyboard 100c can be simplified to save more space.

Figure 5:
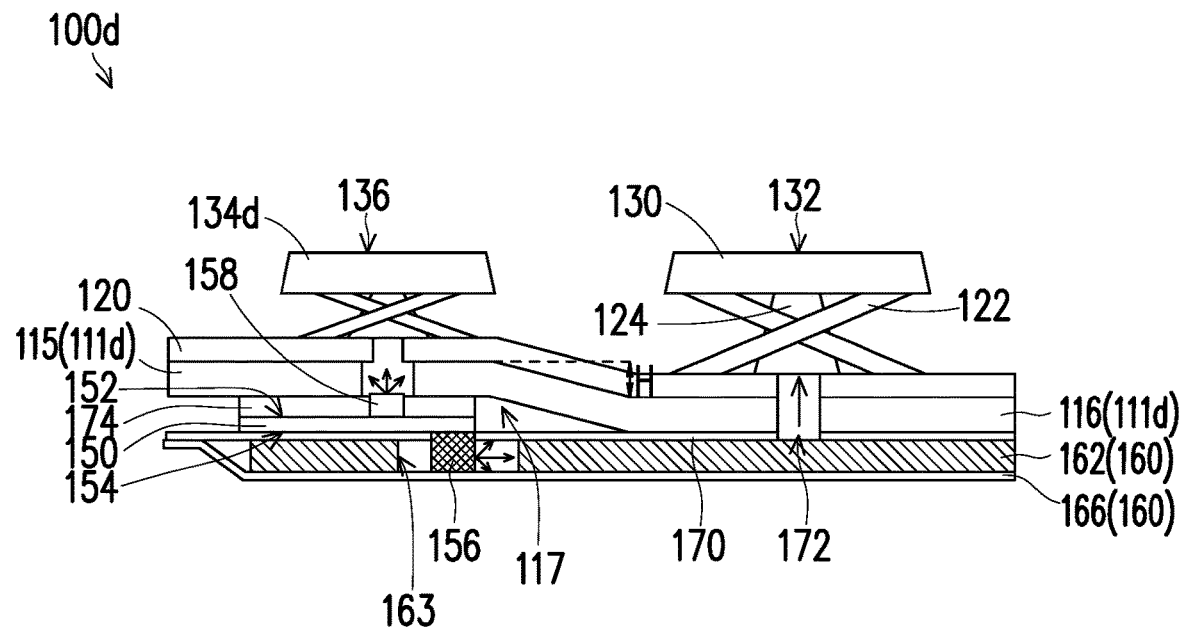
FIG. 5 is a partially enlarged schematic sectional view of an illuminated keyboard according to another embodiment of the disclosure.

FIG. 5 is a partially enlarged schematic sectional view of an illuminated keyboard 100d according to another embodiment of the disclosure. With reference to FIG. 5, in this embodiment, the bracket 111d includes a first segment 116 and a second segment 115. The first segment 116 of the bracket 111d corresponds to the first key cap 130, and the second segment 115 of the bracket 111d corresponds to the top-emitting element 158. Hence, an orthographic projection of the at least one first key cap 130 projected to the bracket 111d is located at the first segment 116, and an orthographic projection of the top-emitting element 158 projected to the bracket 111d is located at the second segment 115.

In the embodiment, the second key cap 134d is disposed above the second segment 115 so that the top-emitting element 158 is located below the second key cap 134d and emits towards the second key cap 134d.

It is worth mentioning that, in the embodiment, the bracket 111d is bent with an inclined segment connected between the first segment 116 and the second segment 115, so that a level height of a top surface (or a bottom surface) of the first segment 116 of the bracket 111d is lower than a level height of a top surface (or a bottom surface) of the second segment 115 of the bracket 111d, by a height difference H. However, in other embodiment, the first segment 116 and the second segment 115 may be located at the same plane, it is not limited thereto.

The top surface 136 of the second key cap 134d and the top surface 132 of the first key cap 130 are at a same height, so as to provide consistency in appearance. Moreover, the first key cap 130 and the second key cap 134d may be arranged in different sizes, for instance, as shown in FIG. 5, the size of the first key cap 130 can be greater than that of the second key cap 134d. In addition, as shown in FIG. 5, the first key cap 130 may be arranged with a greater keystroke travel distance than the second key cap 134d, in order to adapt different level heights of the first segment 116 and the second segment 115.

Due to the bent shape of the bracket 111d, an accommodating space 117 is formed below the second segment 115 of the bracket 111d, and the circuit board 150 is located in the accommodating space 117. In addition, the illuminated keyboard 100 may further include a spacer 174 located between the second segment 115 of the bracket 111d and the circuit board 150 or between the circuit board 150 and the backlight module 160 so as to maintain the position of the circuit board 150.

The arrangement and transmission of the side-emitting element 156 and the top-emitting element 158 in the embodiment are similar to the preceding embodiment of FIG. 1. However, it is noted that the configuration of the accommodating space 117 generates more space and flexibility for different arrangements of the circuit board 150.

Figure 6:
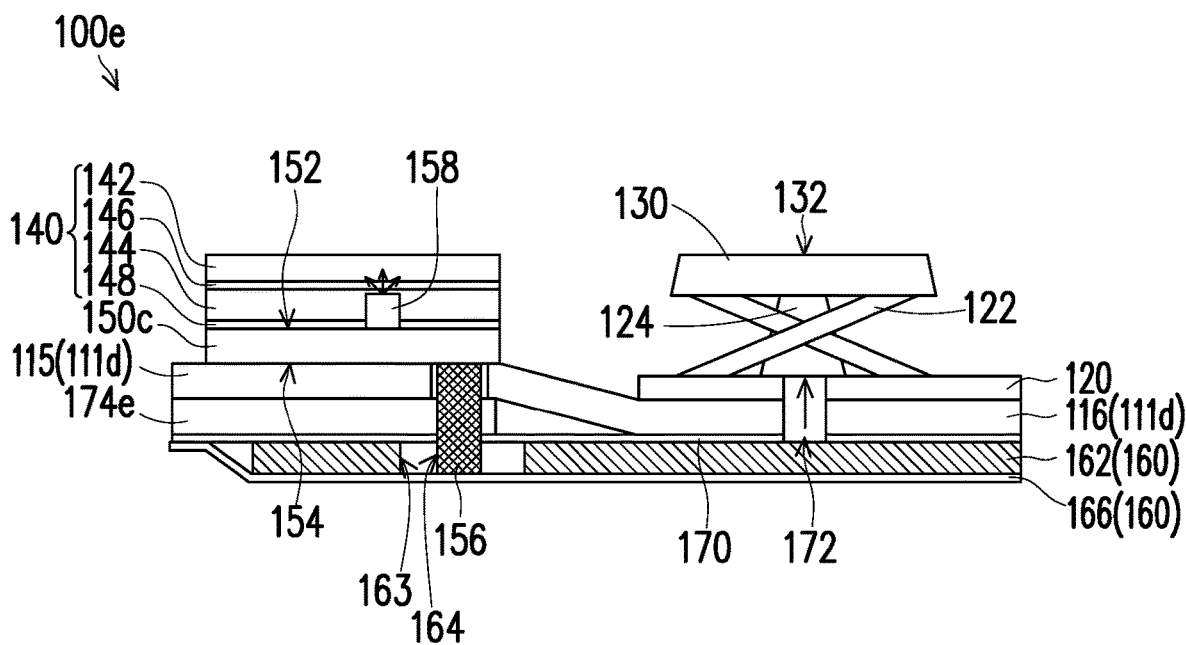
FIG. 6 is a partially enlarged schematic sectional view of an illuminated keyboard according to another embodiment of the disclosure.

FIG. 6 is a partially enlarged schematic sectional view of an illuminated keyboard 100e according to another embodiment of the disclosure. With reference to FIG. 6, the main difference between FIG. 4 and FIG. 6 is that, in this embodiment, the bracket 111d is bent, so that a level height of the first segment 116 of the bracket 111d is lower than a level height of the second segment 115 of the bracket 111d. The touch module 140 is located above the second segment 115.

In this embodiment, a smaller touch module 140 can be adapted to the illuminated keyboard 100e so that the top surface of the touch module 140 can have a same height as the top surface 132 of the first key cap 130, so as to provide consistency in appearance.

The spacer 174e may be optionally arranged below the second segment 115 of the bracket 111d so as to support the bracket 111d and the touch module 140.

Figure 7A:
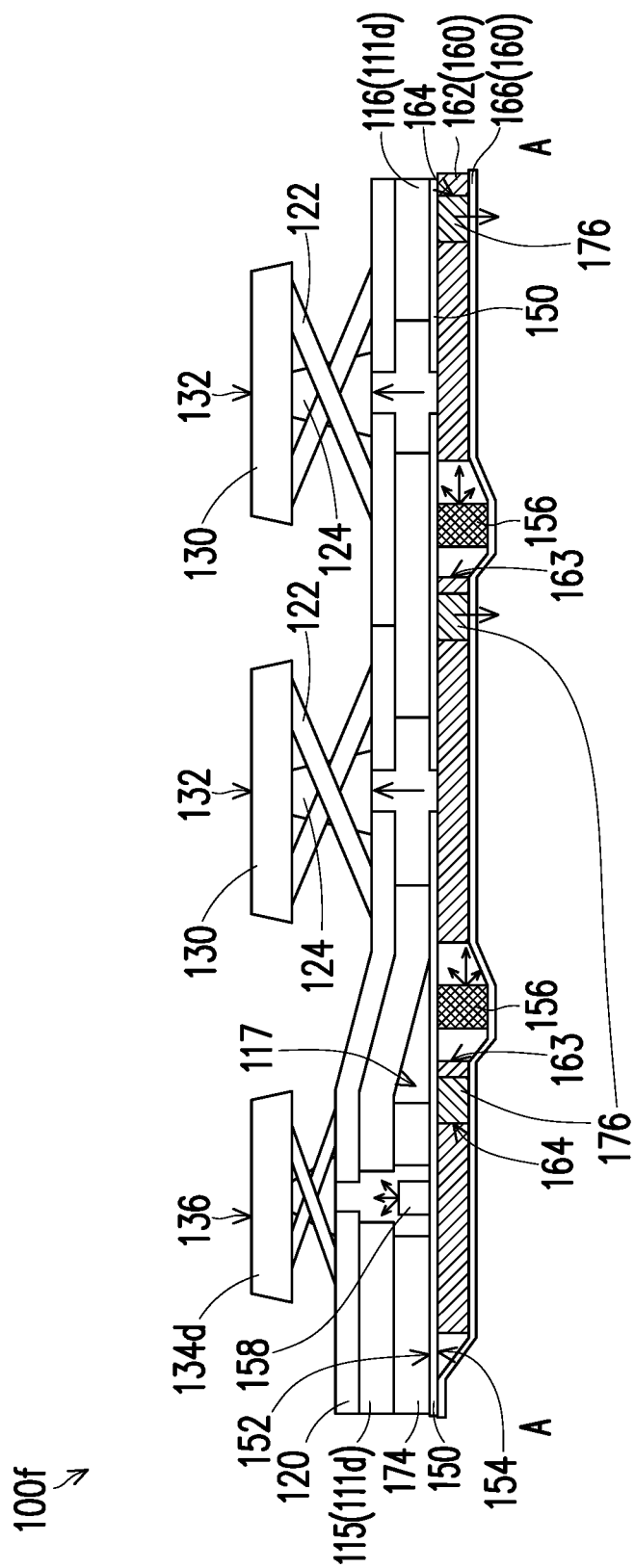
FIG. 7A is a partially enlarged schematic sectional view of an illuminated keyboard according to another embodiment of the disclosure.

FIG. 7A is a partially enlarged schematic sectional view of an illuminated keyboard 100f according to another embodiment of the disclosure. With reference to FIG. 7A, the first main difference between FIG. 5 and FIG. 7A is as below. In FIG. 5, the circuit board 150 is located below the second segment 115 of the bracket 111d and does not extend to a position below the first segment 116 of the bracket 111d. In this embodiment of FIG. 7A, the circuit board 150 is disposed below the first segment 116 and the second segment 115 of the bracket 111d.

Figure 7B:
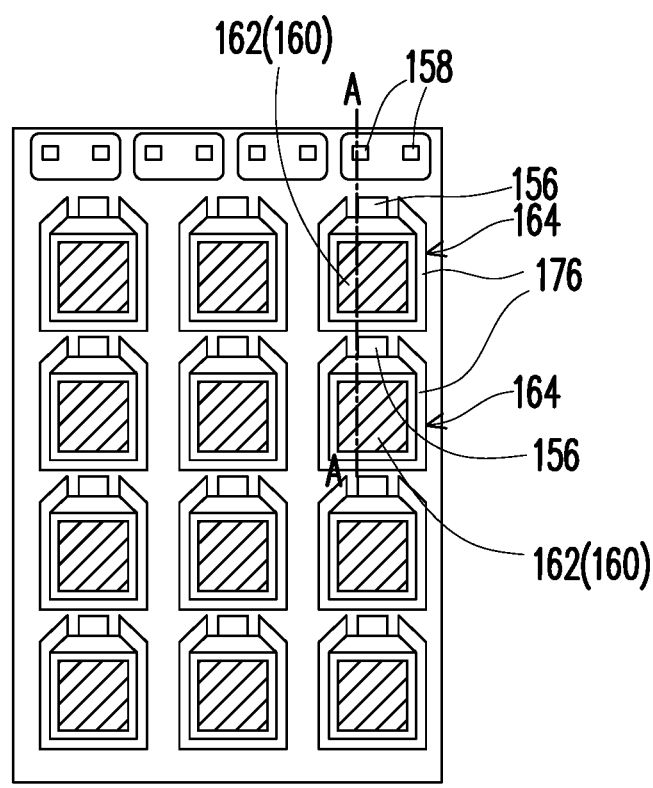
FIG. 7B is a top view of the illuminated keyboard of FIG. 7A.

FIG. 7B is a top view of the illuminated keyboard of FIG. 7A. It is noted that the first key cap 130 and the second key cap 134 are omitted in FIG. 7B so as to show the elements below. In addition, FIG. 7A is the sectional view along lines A-A of FIG. 7B.

The second main difference between FIG. 5 and FIG. 7A is as below. With reference to FIG. 7A and FIG. 7B, the illuminated keyboard 100f further includes at least one mask member 176. The light guide plate 162 includes at least one mask opening 164, the at least one mask member 176 is disposed in the at least one mask opening 164. The mask member 176 is a light blocking material used for preventing light leaking or preventing optical interference from adjacent side-emitting element 156.

In this embodiment, there are a plurality of mask members 176 and a plurality of side-emitting elements 156. As shown in FIG. 7B, the side-emitting elements 156 are arranged in matrix. Each of the mask members 176 surrounds a corresponding side-emitting element 156 and encompasses an area of the light guide plate 162. In the embodiment, each of the mask members 176 is a mask fence surrounding three sides of the corresponding side-emitting element 156. Certainly, the type of the mask member 176 is not limited thereto.

In other embodiments, the mask members 176 may be formed directly on the light guide plate 162 by laser or other treatment. For instances, regions of the light guide plate 162 may be hardening, cutting into a blind hole or through hole, or color tempering into a darker color, to form the mask members 176. In these embodiments, there is no need for configuration of mask opening 164.

As shown in FIG. 7A, each of the mask members 176 is disposed in the light guide plate 162 and located between two adjacent side-emitting elements 156. In addition, an orthographic projection of the first key cap 130 projected to the light guide plate 162 overlaps with the area encompassed by the mask member 176.

That is, light emitted from the side-emitting element 156 enters the light guide plate 162 and transmits within the corresponding area of the light guide plate 162 encompassed by the mask member 176. In FIG. 7A, light transmitted from the light guide plate 162 may only be led toward the corresponding first key cap 130, such that a combination of the side-emitting element 156, the light guide plate 162 and the mask member 176 may be used for providing unique optical effect exclusively for the corresponding first key cap 130.

In the embodiment, the mask members 176 and the mask opening 164 are located between orthographic projections of two adjacent first key caps 130 projected to the light guide plate 162. However, in other embodiment, the mask members 176 and the mask opening 164 may alternatively be within the range of an orthographic projection of the corresponding first key cap 130 projected to the light guide plate 162.

Figure 8:
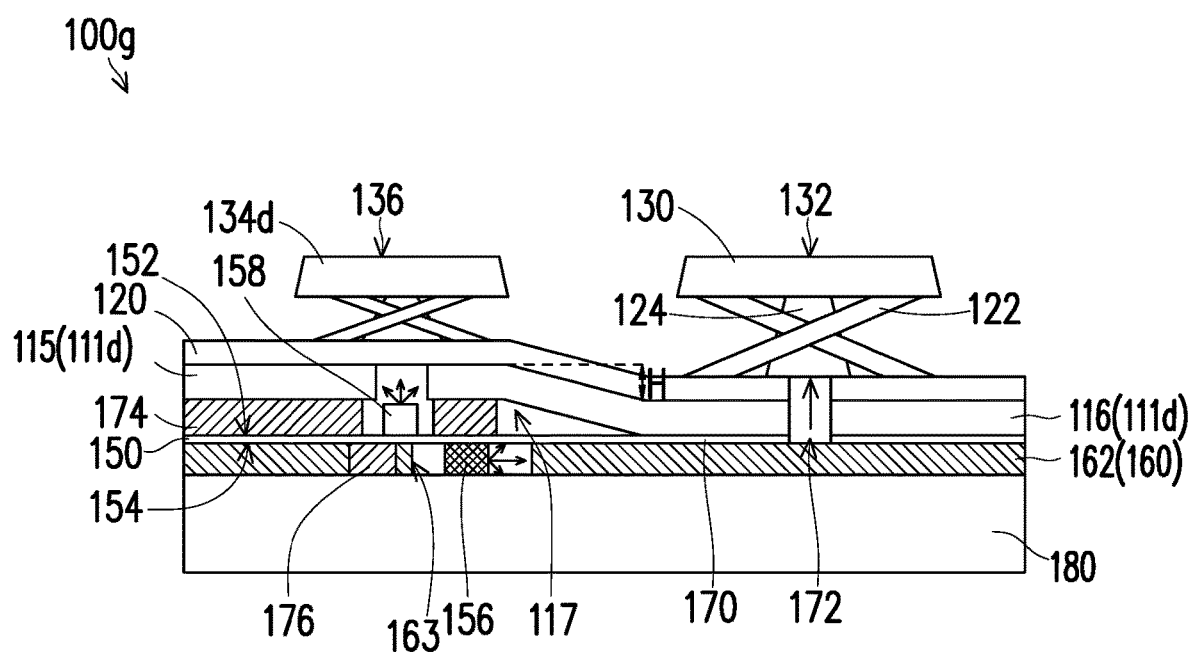
FIG. 8 is a partially enlarged schematic sectional view of an illuminated keyboard according to another embodiment of the disclosure.

FIG. 8 is a partially enlarged schematic sectional view of an illuminated keyboard 100g according to another embodiment of the disclosure. With reference to FIG. 8, the main difference between FIG. 5 and FIG. 8 is below. In FIG. 5, the reflector 166 is disposed below the light guide plate 162, the reflector 166 may be a metal plate or a reflecting film 148.

In this embodiment, the reflector 166 in FIG. 5 is replaced by a reflecting module 180. The light guide plate 162 is located between the reflecting module 180 and the bracket 111*d* of the keyboard module 110, and the reflecting module 180 includes a pattern formed by pigments (not shown).

In this embodiment, the reflecting module 180 is an e-Paper module using Microencapsulated ElectroPhoretic Display technology that rearranges charged pigment particles for visualization different patterns by applied electric field. Certainly, type of the reflecting module 180 is not limited thereto. In other embodiment, the reflecting module 180 may be a reflecting plate including a printed pattern. In addition, the illuminated keyboard 100*g* may further include the mask member 176 to prevent light leaking or optical interference.

In the embodiment, light emitted from the side-emitting element 156 enters the light guide plate 162, transmits within the light guide plate 162 and is reflected by the reflecting module 180. The pattern of the reflecting module 180 is illuminated by the light, and the image of the pattern can be seen from the first key cap 130. Meanwhile, light emitted from the top-emitting element 158 transmits upwardly, passes through the bracket 111*d* and the circuit membrane 120, and emits toward the second key cap 134*d*. The first key cap 130 and the second key cap 134*d* are at least partially made by light transmissive material, preferably transparent material, so that the image can be seen.

Figure 9:
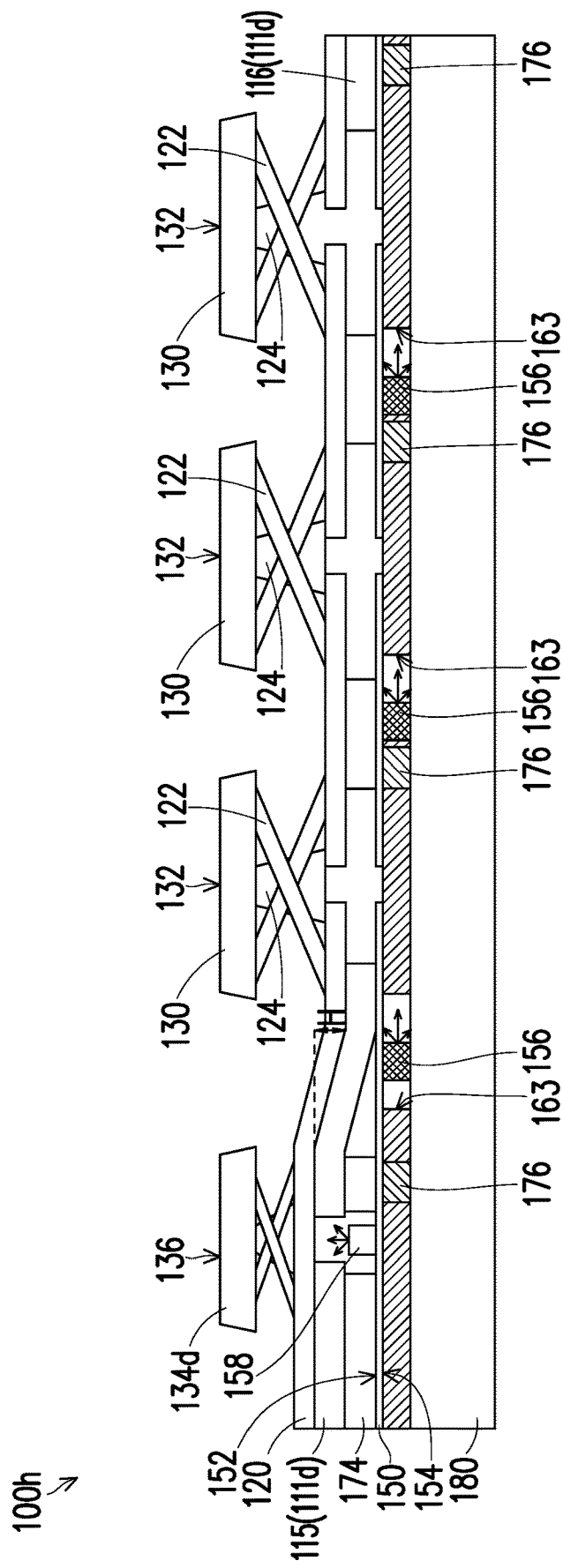
FIG. 9 is a partially enlarged schematic sectional view of an illuminated keyboard according to another embodiment of the disclosure.

FIG. 9 is a partially enlarged schematic sectional view of an illuminated keyboard 100*h* according to another embodiment of the disclosure. With reference to FIG. 9, the main difference between FIG. 7A and FIG. 9 is that, the reflector 166 of FIG. 7 is replaced by the reflecting module 180 of FIG. 9, as illustrated in the embodiment of FIG. 8. It is apparent that the reflecting plate 160 in other embodiments may also be replaced by the reflecting module 180.

Figure 10:
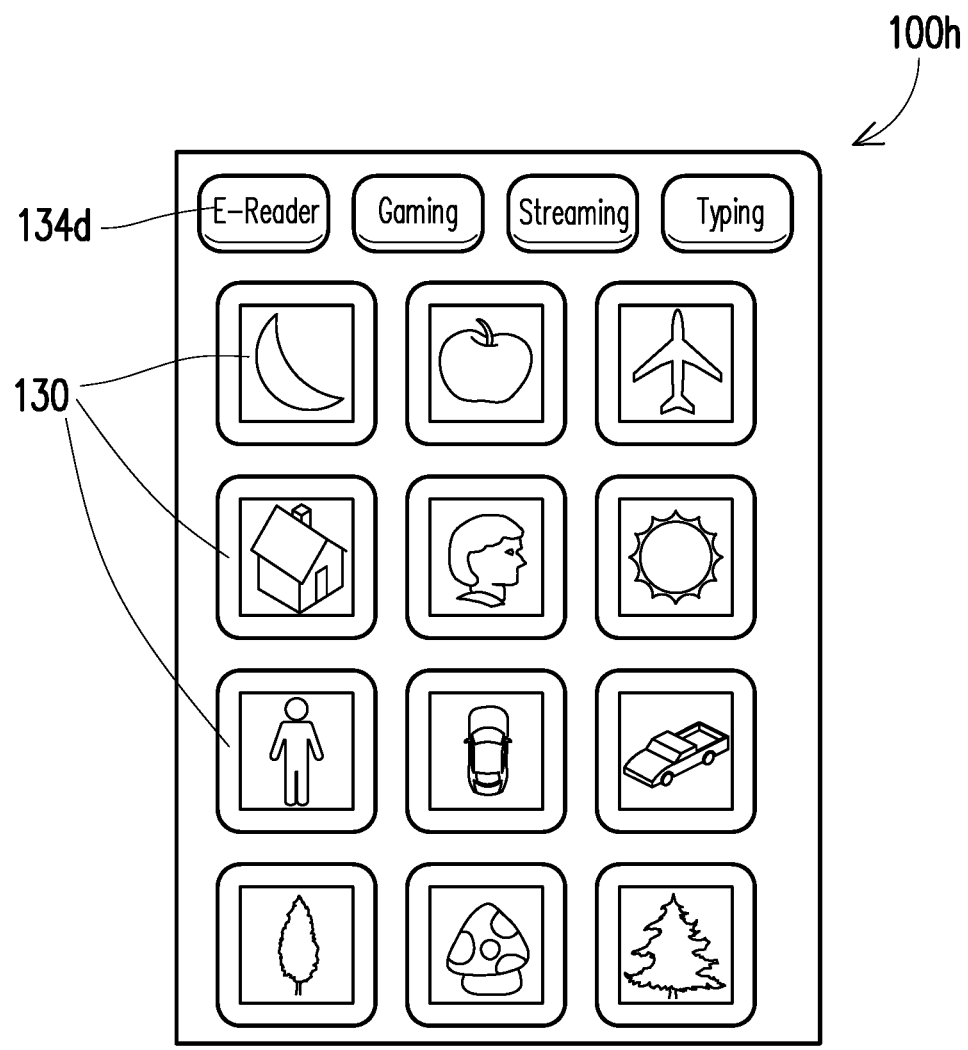
FIG. 10 is a schematic top view of the illuminated keyboard according to FIG. 9.

FIG. 10 is a schematic top view of the illuminated keyboard 100*h* according to FIG. 9. With reference to FIG. 10, by provision of the reflecting module 180 (FIG. 9), images, in addition to symbols and characters, can be present from the first key cap 130 and second key cap 134*d*, to deliver or feedback messages with more abounding information. The images, symbols and characters shown on the first key caps 130 and second key caps 134*d* can be changed by rearrangement of the pigment particles composing the pattern of the reflecting module 180 or simply substituting the reflecting module 180 with one having an alternative printed pattern.

To sum up, the illuminated keyboard provided by the embodiments of the disclosure includes one circuit board on which the at least one side-emitting element and the top-emitting element are integrated. The at least one side-emitting element emits light from its side to illuminate the first key cap while the top-emitting element emits light upwardly to illuminate the second key cap or the touch module on the top thereof. In this way, the embodiment of the disclosure is capable to illuminate specific keys or different modules with reduced elements and space.

It will be apparent to those skilled in the art that various modifications and variations can be made to the disclosed embodiments and features can be exchanged or applied between the disclosed embodiments, without departing from the scope or spirit of the disclosure. In view of the foregoing, it is intended that the disclosure covers modifications and variations fall within the scope of the following claims and their equivalents.

What is claimed is:

1. An illuminated keyboard, comprising:
  a keyboard module, comprising:
    a bracket; and
    at least one first key cap, disposed above the bracket;
  a circuit board, the circuit board has a first surface facing towards the at least one first key cap and a second surface facing away from the at least one first key cap, at least one top-emitting element is disposed on the first surface, and at least one side-emitting element is disposed on the second surface; and
  a backlight module, disposed below the keyboard module and comprising:
    a light guide plate having a slot; wherein the at least one side-emitting element extends into the slot such that the light emitted from the at least one side-emitting element enters the light guide plate, the light passes through a light output zone of the bracket and illuminate the at least one first key cap.

2. The illuminated keyboard according to claim 1, wherein the circuit board is disposed between the backlight module and the keyboard module.

3. The illuminated keyboard according to claim 2, further comprising a mask layer, wherein the mask layer is disposed between the circuit board and the keyboard module or between the circuit board and the backlight module, the mask layer comprises a transparent zone, light emitted from the top-emitting element or the at least one side-emitting element emitted to the at least one first key cap through the transparent zone.

4. The illuminated keyboard according to claim 1, wherein the backlight module comprises a reflector, the light guide plate and the circuit board are located between the bracket and the reflector.

5. The illuminated keyboard according to claim 1, wherein the bracket comprises a first segment and a second segment, an orthographic projection of the at least one first key cap projected to the bracket is located at the first segment, and an orthographic projection of the top-emitting element projected to the bracket is located at the second segment.

6. The illuminated keyboard according to claim 5, further comprising a touch module or a second key cap disposed above the second segment of the bracket so that the top-emitting element is located below the touch module or the second key cap and emits towards the touch module or the second key cap.

7. The illuminated keyboard according to claim 6, wherein a top surface of the second key cap or the touch module and a top surface of the first key cap are at a same height.

8. The illuminated keyboard according to claim 6, wherein a level height of a top surface of the first segment of the bracket is lower than a level height of a top surface of the second segment of the bracket, and the first key cap has a greater keystroke travel distance than the second key cap.

9. The illuminated keyboard according to claim 8, wherein the bracket comprises an inclined segment connected between the first segment and the second segment.

10. The illuminated keyboard according to claim 8, wherein an accommodating space is formed below the second segment of the bracket, and the circuit board is located in the accommodating space.

11. The illuminated keyboard according to claim 10, further comprising a spacer, located between the bracket and the circuit board or between the circuit board and the backlight module.

12. The illuminated keyboard according to claim 6, wherein the touch module comprises a touch plate and a light guide layer, the circuit board is disposed between the touch module and the backlight module.

13. The illuminated keyboard according to claim 12, wherein the touch module further comprises a reflecting film, the reflecting film is located between the light guide layer and the circuit board, the reflecting film comprises a least one hole accommodating the top-emitting element.

14. The illuminated keyboard according to claim 1, further comprising at least one mask member, the at least one side-emitting element comprises a plurality of side-emitting elements, each of the at least one mask member is disposed on the light guide plate and located between two adjacent side-emitting elements.

15. The illuminated keyboard according to claim 14, wherein the light guide plate comprises at least one mask opening, and the at least one mask member is disposed in the at least one mask opening.

16. The illuminated keyboard according to claim 14, wherein the mask member is a mask fence, the mask fence surrounds three sides of one of the side-emitting elements.

17. The illuminated keyboard according to claim 1, further comprising a reflecting module, the light guide plate is located between the reflecting module and the keyboard module, the reflecting module comprises a pattern formed by pigments.

18. The illuminated keyboard according to claim 17, wherein the reflecting module is an e-Paper module.

* * * * *